(12) United States Patent
Han et al.

(10) Patent No.: US 7,849,222 B2
(45) Date of Patent: Dec. 7, 2010

(54) METHOD OF SYNCHRONIZING MULTIPLE CONTENT DIRECTORY SERVICES, AND CONTENT DIRECTORY SERVICE DEVICES AND A SYSTEM THEREOF

(75) Inventors: Se-hee Han, Seoul (KR); Seung-jae Oh, Seoul (KR); Won-Seok Kwon, Suwon-si (KR); Joo-yeol Lee, Seoul (KR); Dong-shin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 775 days.

(21) Appl. No.: 11/727,522

(22) Filed: Mar. 27, 2007

(65) Prior Publication Data

US 2007/0260752 A1 Nov. 8, 2007

Related U.S. Application Data

(60) Provisional application No. 60/793,713, filed on Apr. 21, 2006.

(30) Foreign Application Priority Data

Oct. 30, 2006 (KR) ...................... 10-2006-0105921

(51) Int. Cl.
*G06F 15/16* (2006.01)
(52) U.S. Cl. ..................................... 709/248
(58) Field of Classification Search .................. 709/248
See application file for complete search history.

(56) References Cited

U.S. PATENT DOCUMENTS

| | | | |
|---|---|---|---|
| 7,181,642 B1 * | 2/2007 | Heideman et al. | 714/6 |
| 7,287,180 B1 * | 10/2007 | Chen et al. | 714/4 |
| 2004/0139180 A1 * | 7/2004 | White et al. | 709/221 |
| 2005/0022210 A1 * | 1/2005 | Zintel et al. | 719/318 |
| 2005/0055352 A1 * | 3/2005 | White et al. | 707/10 |
| 2005/0204065 A1 * | 9/2005 | Son et al. | 709/248 |
| 2006/0179079 A1 * | 8/2006 | Kolehmainen | 707/104.1 |
| 2007/0226312 A1 * | 9/2007 | Stirbu et al. | 709/217 |

FOREIGN PATENT DOCUMENTS

| | | |
|---|---|---|
| CN | 1681256 A | 10/2005 |
| EP | 1587251 A2 | 10/2005 |

(Continued)

*Primary Examiner*—John Follansbee
*Assistant Examiner*—Imad Hussain
(74) *Attorney, Agent, or Firm*—Sughrue Mion, PLLC

(57) ABSTRACT

A method of synchronizing a plurality of content-directory service (CDS) devices is provided. The method includes retrieving and discovering N CDS devices in a home network by a control point (CP), transmitting a StartSync message that requests the start of synchronization to a certain CDS device of the N CDS devices by the CP, forwarding a StartPeerSync message that informs remaining N-1 CDS devices of the fact that synchronization will be started by the CDS device that has received the StartSync message, and synchronizing each of the N CDS devices with the remaining N-1 CDS devices, in a home network that includes N CDS devices that provide metadata of multimedia content existing in the home network, and the CP that receives metadata from the N CDS devices and requests the media renderer to replay the multimedia data.

13 Claims, 5 Drawing Sheets

FOREIGN PATENT DOCUMENTS

| | | |
|---|---|---|
| JP | 2003-216471 A | 7/2003 |
| JP | 2005-242737 A | 9/2005 |
| JP | 2006-099164 A | 4/2006 |
| KR | 10-0582549 B1 | 5/2006 |
| WO | 2006/018717 A1 | 2/2006 |

* cited by examiner

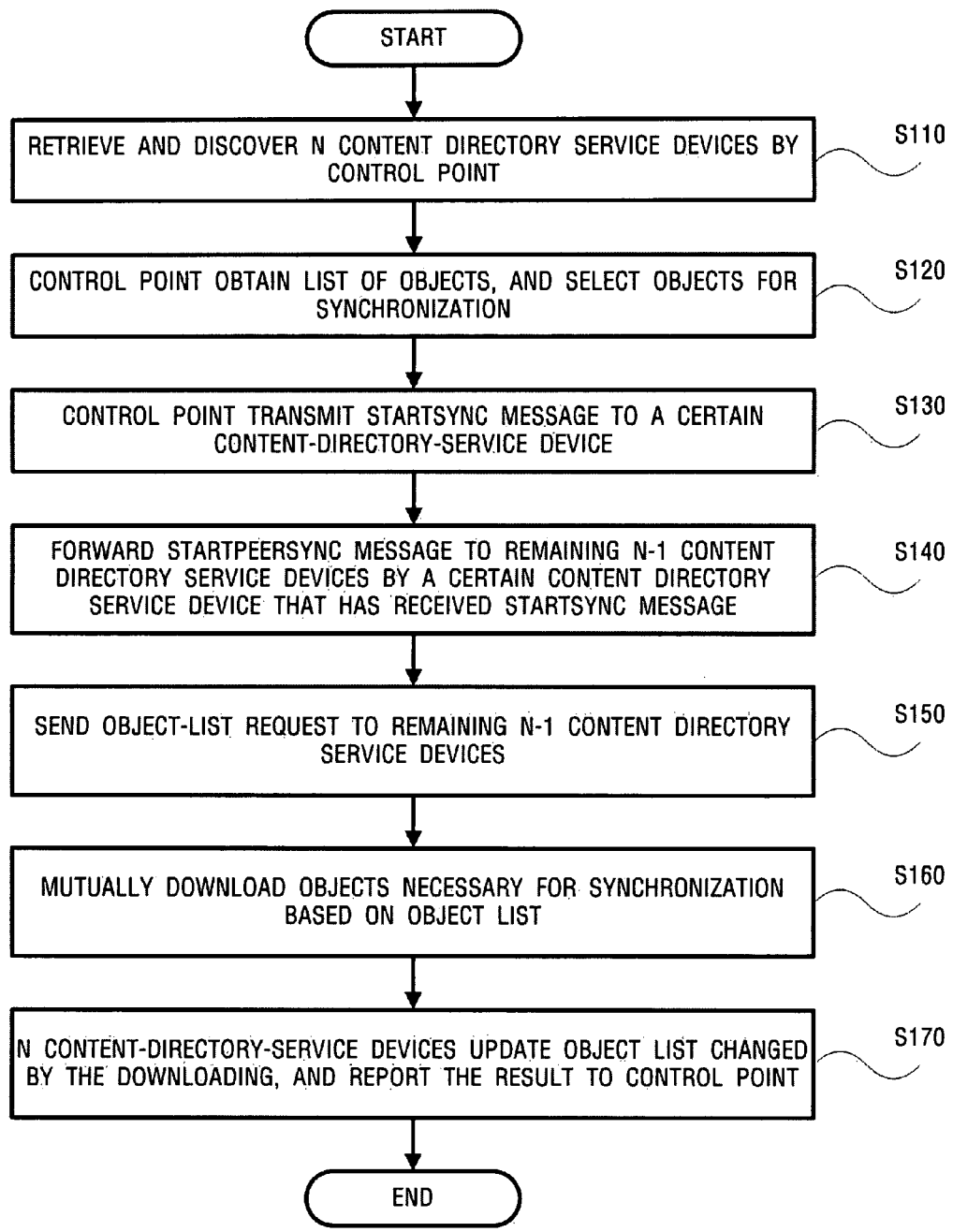

US 7,849,222 B2

METHOD OF SYNCHRONIZING MULTIPLE CONTENT DIRECTORY SERVICES, AND CONTENT DIRECTORY SERVICE DEVICES AND A SYSTEM THEREOF

CROSS-REFERENCE TO RELATED APPLICATION

This application claims priority from Korean Patent Application No. 10-2006-0105921 filed on Oct. 30, 2006 in the Korean Intellectual Property Office, and U.S. Provisional Patent Application No. 60/793,713 filed on Apr. 21, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to a home network. More particularly, the present invention relates to a method of synchronizing a plurality of content directory service (CDS) devices, and a CDS device used in the synchronizing method and a system thereof.

2. Description of the Related Art

Generally, a home network is formed of a private network based on the Internet Protocol (IP), and controls various devices such as personal computers (PC), intelligence products and wireless devices by connecting them as one network through a common virtual computing environment.

Middleware makes communication between devices possible by connecting various digital devices in a peer-to-peer manner, and home AV interoperability (HAVI), universal plug and play (UPnP), Java intelligent network infra-structure (Jini), home wide web (HWW), and others have been suggested for the middleware.

In a computing environment established through the UPnP middleware, each device is allocated an address according to the dynamic host configuration protocol (DHCP), or is allocated an address selected by the automatic IP-specifying function (Auto IP), through which communication between devices, and retrieval and inquiry on the network are performed.

The UPnP network is a home-network technology that is projected to be widely used in the near future, and defines the UPnP device and the UPnP service, and is defined by the protocol between them. The UPnP network is constituted by a controlled device (CD), which is a home-network device connected to and controlled by the home network, and a control point (CP), which is a device for controlling such a CD. The CP controls the CD, and requests and receives events. The CD performs specified functions according to the request of the CP, and when the state of the CD is changed, the CD sends the event to the CP that has requested the event.

The operation of conventional UPnP network devices includes an advertisement process, a discovery process, a description process, a control process, and an event process.

In the advertisement process, a new CD is connected to the home network, and informs other devices in the home network of its presence. In the discovery process, a new CD is connected to the home network, and discovers CDs operated in the home network. In the description process, the CP parses a service-description XML file or a device-description XML file using the IP address of the CD acquired in the discovery process, and recognizes the functions of the added device in detail. In the control process, in the case where the CP intends to provide a certain service using the CD, the CP transmits a control message (action request) that requests a predetermined service to the CD using simple object access protocol (SOAP) according to the UPnP device architecture, and receives a response message to the control message (result, a variable value). In the event process, the state of the information change of the CD, which has provided a predetermined service by the control command transmitted from the CP, is checked.

The UPnP AV technology, which allows a user to enjoy multimedia content such as audio and video content based on UPnP technology, is described in the UPnP AV specification. According to the UPnP specification, the UPnP AV architecture consists of a media server that provides multimedia files through a content directory service (CDS), a media renderer that replays the provided multimedia files, and a CP that controls the media server and the media renderer so that they operate together. The CDS is built in the media server, and provides metadata of content existing in the home network or stored in the media server to the CP. The CP checks the metadata from the CDS, and requests the media renderer to replay it.

In the case where there are multiple devices that constitute the above-described UPnP AV architecture in the home network, multiple media servers that store different content, and multiple CDS exist. In such a UPnP AV environment, there is a need for a method where the user of the UPnP AV synchronizes a certain CDS with different CDS. That is, there is a need to synchronize content scattered in different CDS. Here, the synchronization means that content held in each CDS and the metadata are exchanged between CDS according to a certain policy specified by the user. For example, if content stored in a device such as a MP3 player is synchronized with the home media center, the user can enjoy high-volume sound using a Hi-Fi device existing in the home.

However, in the case where a plurality of CDS participate in synchronization, the CP has to play many roles such as collecting logs and determining CDS pairs to participate in synchronization, and as the number of CDS that participate in synchronization increases, the number of synchronizations rapidly increases, both of which are problems.

SUMMARY OF THE INVENTION

An object of the present invention is to provide a method of synchronizing a plurality of content directory service (CDS) devices, a CDS device used in the synchronization, and the system including the CDS device, in which the number of synchronizations is minimized, and the reliance on the control point (CP) is lowered, whereby the network traffic is minimized, which is caused by synchronization and the time that takes in the synchronization.

The present invention will not be limited to the technical objects described above. Other objects not described herein will be better understood by those in the art from the following detailed description.

According to an exemplary embodiment of the present invention, there is provided a method of synchronizing a plurality of CDS devices, the method including retrieving and discovering N CDS devices in a home network by a control point (CP), transmitting a StartSync message that requests the start of synchronization to a CDS device of the N CDS devices by the CP, forwarding a StartPeerSync message that informs remaining N-1 CDS devices of the fact that synchronization will be started by a certain CDS device that has received the StartSync message, and synchronizing each of the N CDS devices with the remaining N-1 CDS devices, in a home network that includes N CDS devices that provide metadata of multimedia content existing in the home network, and the CP that receives metadata from the N CDS devices and requests the media renderer to replay it.

According to an exemplary embodiment of the present invention, there is provided a CDS device CDS, the device including a log-change-management unit that manages the change of the log information on N CDS devices that provide metadata of multimedia content existing in a home network, a log-change-providing unit that provides information on the change of log information managed by the log-change-management unit to remaining N-1 CDS devices, and a control point (CP), an anchor-information-management unit that manages anchor information that can determine whether the object list of the CDS device has been updated by the synchronization process between the N-1 CDS devices and the CDS device.

According to an exemplary embodiment of the present invention, there is provided a system including a media server that includes built-in CDS devices that provide metadata of multimedia content existing in a home network, and provides multimedia content, a media renderer that replays the provided multimedia content, and a control point (CP) that controls the media server and the media renderer, and synchronizes the CDS device, in which the synchronization between the N CDS devices is performed in the case where the CP transmits the StartSync message that requests synchronization to a certain CDS of N CDS devices existing in the home network, and the CDS forwards the StartPeerSync message that informs the remaining N-1 CDS devices of the fact that the synchronization will be started.

BRIEF DESCRIPTION OF THE DRAWINGS

The above and other features and advantages of the present invention will become apparent by describing in detail exemplary embodiments thereof with reference to the attached drawings in which:

FIG. 5 is a flowchart illustrating a method of synchronizing a plurality of CDS devices according to an exemplary embodiment of the present invention.

DETAILED DESCRIPTION OF THE INVENTION

Figure 1A:
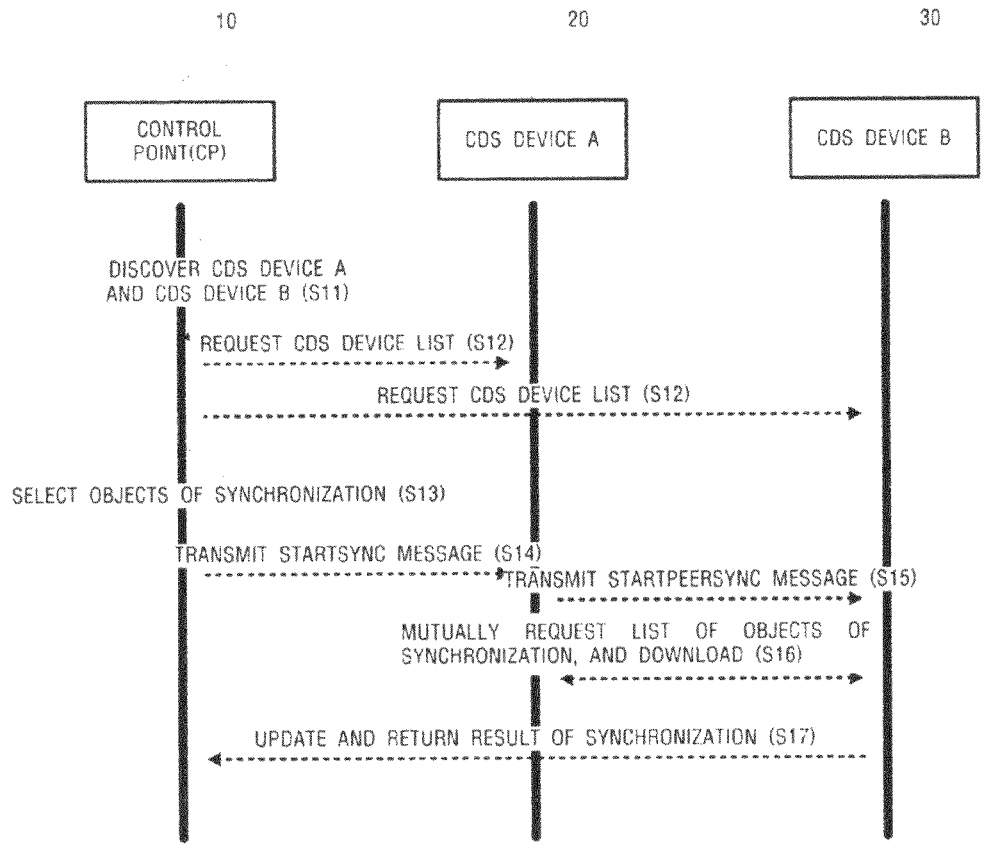
FIG. 1A illustrates a process of synchronizing two content directory service (CDS) devices.

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

A method of synchronizing a plurality of CDS devices, a CDS device used in the synchronization, and the system including the CDS device are described in the following with reference to block diagrams and flowcharts.

In the exemplary embodiments of the present invention, the description will center on a UPnP AV system operated mainly based on the UPnP for explanatory convenience, and the names of devices specified in the UPnP AV specification will be used for the devices when implementing the present invention. However, it should be clear that the scope of the present invention is not limited by the above-mentioned home network system and devices.

Figure 1B:
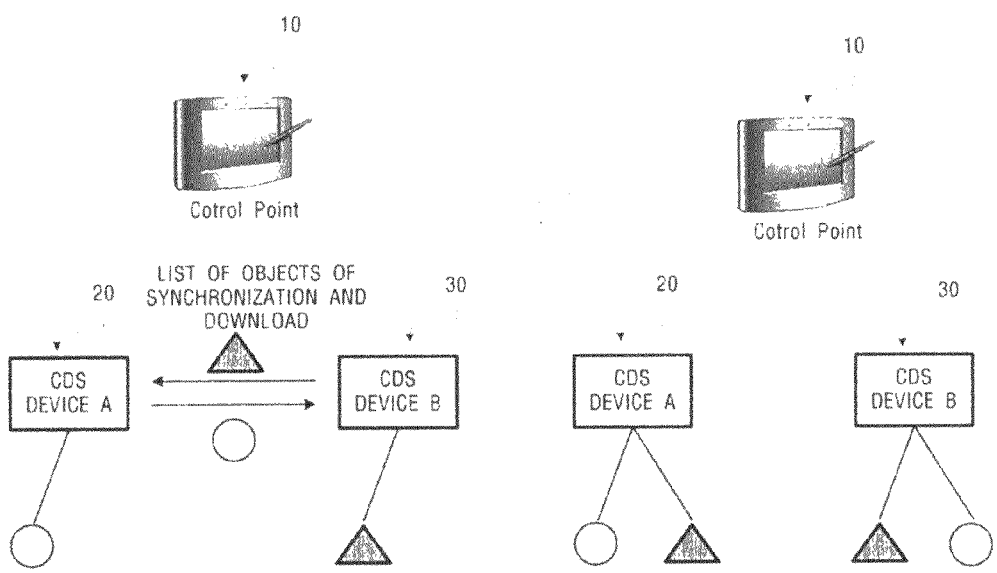
FIG. 1B illustrates the concept of updating the CDS as a result of the synchronization process of FIG. 1A.

FIG. 1A illustrates a process of synchronizing two CDS devices, and FIG. 1B illustrates the concept of updating the CDS as a result of the synchronization process of FIG. 1A. First, a control point (CP) 10 discovers CDS device A 20 and CDS device B (S11), and requests the CDS list from the discovered CDS device A 20 and CDS device B 30 (S12). The CP 10 selects the object, which is the object of synchronization, from the CDS device A 20 and CDS device B 30 (S13). If the CP 10 transmits the StartSync message that requests the start of the synchronization to the CDS device A 20, the CDS device A 20 forwards the StartPeerSync message that informs of the start of synchronization to the CDS device B 30 (S15).

By the above-described processes, the synchronization between the CDS device A 20 and the CDS device B 30 is started, and the CDS device A 20 and the CDS device B 30 request the object list to be synchronized from the other CDS device, and downloads the requested object list (S16). If the download is completed, the CDS device A 20 and the CDS device B 30 update their object list based on the downloaded object list, and returns the result to the CP 10 (S17). The change of the object list by the update is illustrated in FIG. 1B. FIG. 1B shows that the CDS device A 20 and the CDS device B 30 are synchronized because the CDS device A 20 and CDS device B 30 store the same object list.

However, in the case where there are not two, but N CDS devices (N>=3), the situation gets complicated. The case where there are three CDS devices is described in the following.

Figure 2:
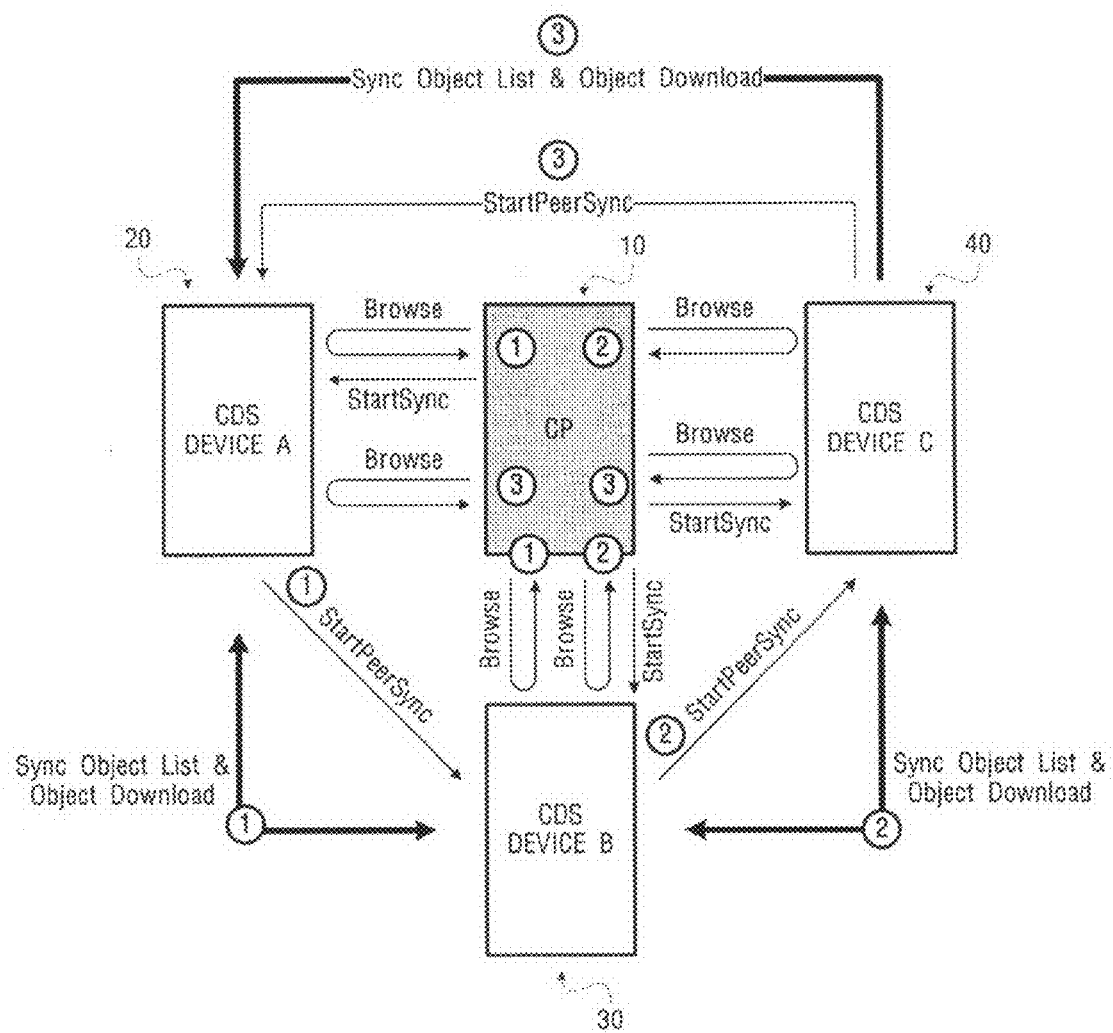
FIG. 2 illustrates the synchronization process in the case where there are three CDS devices.

FIG. 2 illustrates the synchronization process in the case where there are three CDS devices. Referring to FIG. 2, the CP selects and synchronizes two of the three CDS devices, and then synchronizes another CDS pair. As illustrated in FIG. 2, it is assumed that the CP selects the CDS A and the CDS B first for synchronization. The, synchronization process performed in FIGS. 1A and 1B is performed in the same manner (a first process), the synchronization process is performed in the same manner after selecting the CDS B and the CDS C (a second process), and finally, the synchronization process is performed after selecting the CDS C and the CDS A (a third process). The detailed operations of the first, second and third processes are the same as the operation described in the description of FIG. 1A, so a description of the detailed, operation of each process is omitted here.

In order to synchronize N (N>=3) CDS devices by extending the concept illustrated in FIG. 2, two of N CDS devices are selected and synchronized, and this selection and synchronization should be repeated in order. That is, the synchronization should be repeated for the maximum NC2 (=N(N-1)/2) times, and in the case where there is a problem in the synchronization process, it is hard to return back to the original state. Further, because the CP that provides a simple control function should have an algorithm that selects and combines two of the N CDS devices, the cost of the CP increases, which is a problem.

Figure 3:
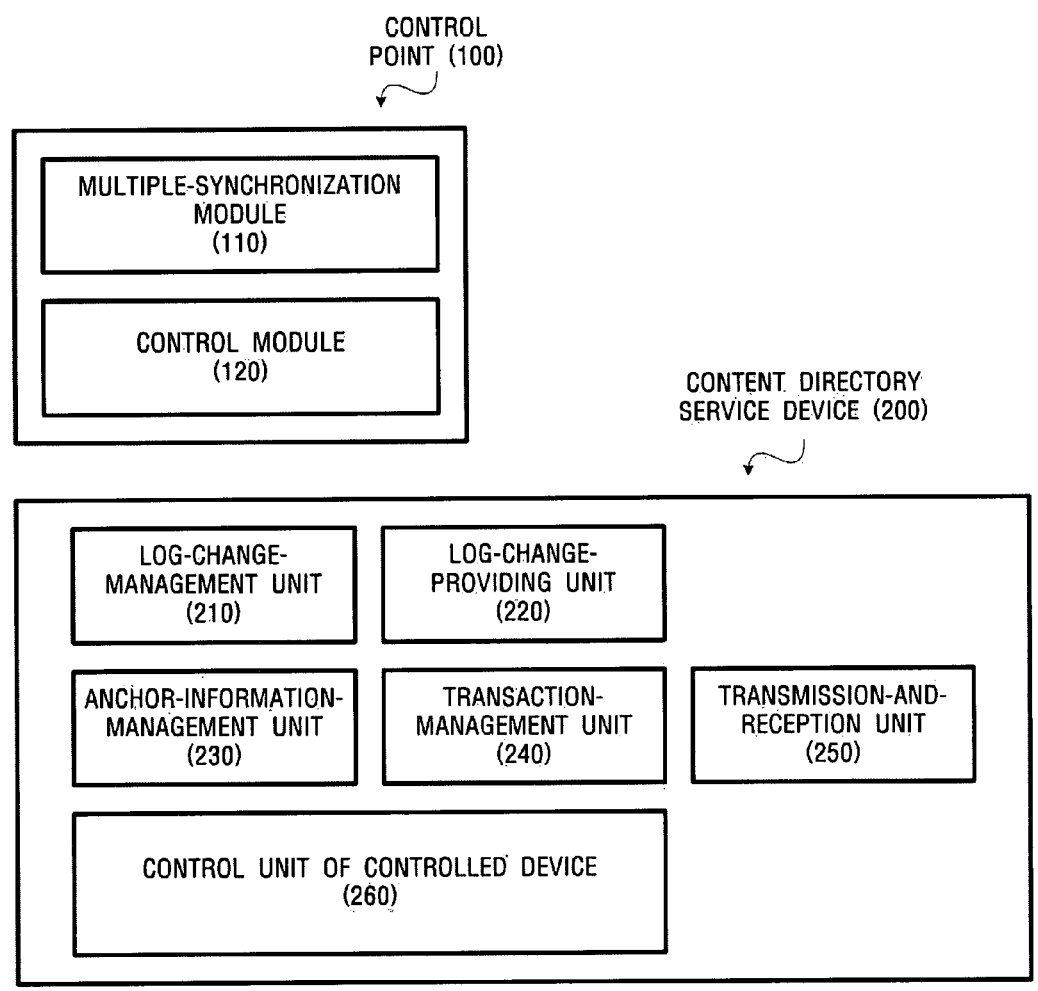
FIG. 3 illustrates the structure of a system that includes a control point (CP) and a CDS device according to an exemplary embodiment of the present invention.

Hence, a method of synchronizing a plurality of CDS devices, a CDS device used in the synchronization, and the system including the CDS device, in which the number of synchronizations is minimized, and the reliance on the CP is lowered, whereby the network traffic, which is caused by synchronization and the time that takes in synchronization, is minimized, are described in detail as follows:

FIG. 3 illustrates the structure of a system that includes a CP and a CDS device according to an exemplary embodiment of the present invention. The UPnP AV architecture system will be described in the following as an example of the system, and it is assumed that the UPnP AV architecture system includes N CDS devices and CPs. Further, the UPnP AV architecture system includes a media server in which the CDS devices are built, and a media renderer that replays multimedia content stored in the media server.

Referring to FIG. 3, the CP 100 includes a multiple-synchronization module 110 and a control module 120. The multiple-synchronization module 110 synchronizes CDS devices that provide metadata of multimedia content existing in the UPnP AV system. Further, the control module 120 controls the N CDS devices synchronized by the multiple-synchronization module 110, and controls devices (the media server or the media renderer) existing within the UPnP AV system in such a manner that the multimedia content can be replayed.

Further, a CDS 200 controlled by the CP 100 includes a log-change-management unit 210, a log-change-providing unit 220, an anchor-information-management unit 230, a transaction-management unit 240, a transmission/reception unit 250, and a CD-control unit 260.

The log-change-management unit 210 manages the change of log information on the CDS devices that provide metadata of multimedia content existing in the UPnP AV system. The log information includes the information on the list of the objects for synchronization, and is changed according to changes such as generation, modification and deletion of objects.

The log-change-providing unit 220 provides information on the change of the log information managed by the log-change-management unit 210 to the remaining N-1 CDS devices among the N CDS devices, exempting the CDS device 200, and the CP 100 in a predetermined form. Here, it is preferable for the information on the change of the log information to be provided in DIDL-Lite form.

The anchor-information-management unit 230 manages anchor information that can determine whether the object list of the CDS 200 has been updated by the synchronization process between the N-1 CDS and the CDS.

For example, the anchor information can be constituted by a SyncSequence field, a DeviceID field, and a LogId field. The SyncSequence field is determined by the CP 100 that gives the synchronization command, and indicates that the synchronization of the surrounding CDS has been successfully performed. In the synchronization process that is performed later, if the values of the SyncSequence fields of the CDS devices, which are objects of the synchronization in the anchor acquired by the CP 100, are different, it can be considered that the synchronization has failed. The DeviceID field has the ID value that can distinguish CDS devices that are the objects of synchronization. The LogID field has the ID value that can include the changed log information generated after the previous synchronization process by the CDS devices that are objects of synchronization. As shown in the structure of the anchor information, in the first synchronization process, all object lists on other CDS devices should be compared, but once the previous synchronization is performed, the subsequent synchronization can be performed by comparing the content shown in the updated object list that is based on the changes of the log information changed in the previous synchronization process.

The transaction-management unit 240 prevents the remaining N-1 CDS devices and the CP 100 from changing the object list of the CDS device 200 while the synchronization is performed, and can use a predetermined locking mechanism.

The transmission-and-reception unit 250 requests multimedia content to the remaining N-1 remaining CDS devices based on the list of objects of the synchronization, and transmits and receives the multimedia content.

Finally, the CD-control unit 260 controls the operation of CDs existing in the CDS device 200.

The process of synchronizing a plurality of CDS devices is described in the following with reference to FIGS. 4 and 5.

Figure 4:
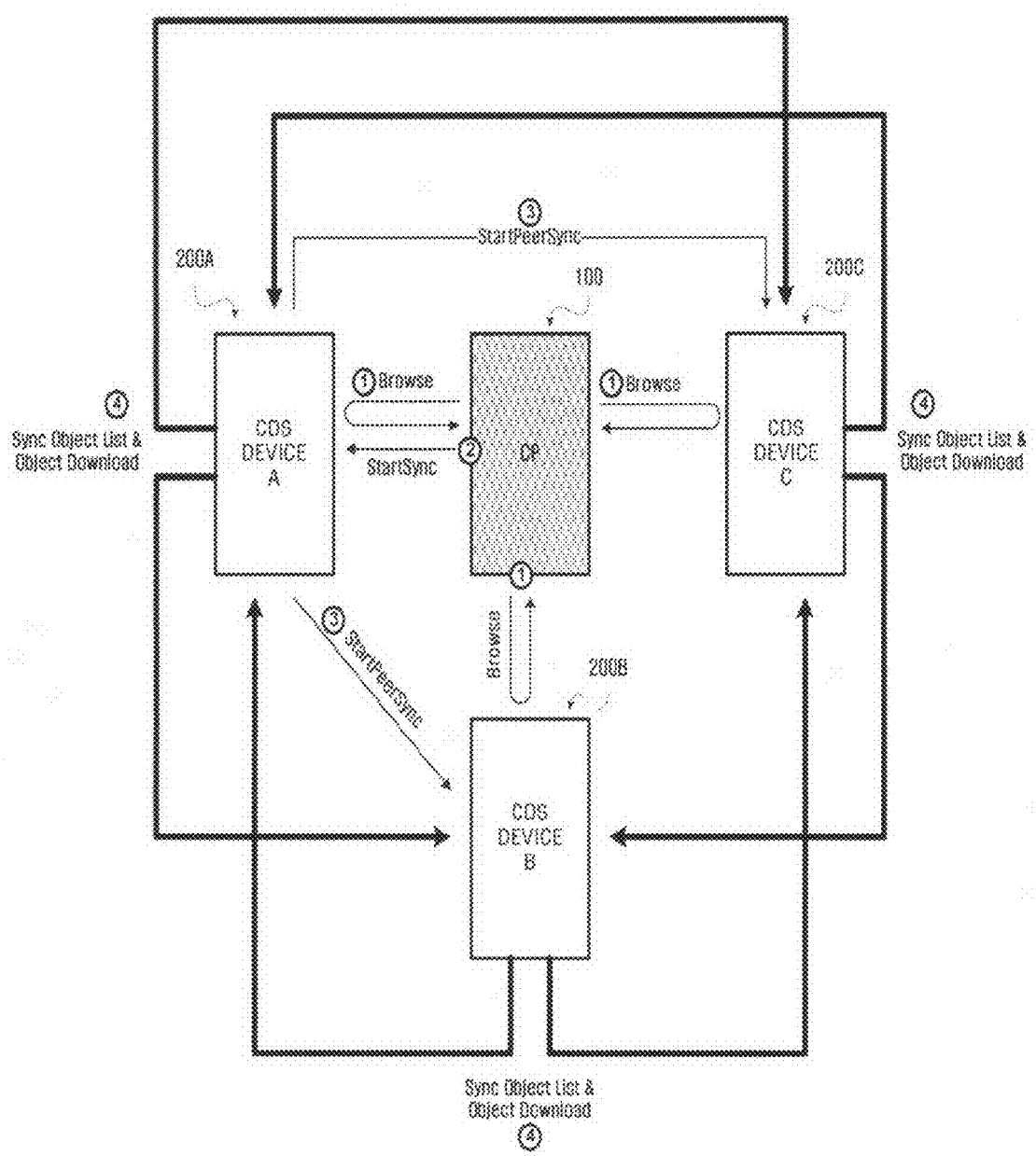
FIG. 4 is a conceptual diagram illustrating the process of synchronizing a plurality of CDS devices according to an exemplary embodiment of the present invention.

FIG. 4 is a conceptual diagram illustrating the process of synchronizing a plurality of CDS devices according to an exemplary embodiment of the present invention, and FIG. 5 is a flowchart illustrating a method of synchronizing a plurality of CDS devices according to an exemplary embodiment of the present invention.

In the UPnP AV system illustrated in FIG. 4, the CP 100 and three CDS devices 200A, 200B and 200C mutually operate for synchronization. There can be more than 3 CDS devices, but in the present exemplary embodiment, it is assumed that there are only three CDS devices for explanatory convenience.

The CP 100 retrieves and discovers three CDS devices 200A, 200B and 200C in the UPnP AV system (S110) (first process).

The CP 100 obtains the object list for the discovered three CDS devices, and selects the object of synchronization based on the obtained object list (S120). The object of the synchronization includes the item corresponding to the multimedia file and the container that includes the item.

The CP that has selected the object of the synchronization transmits the StartSync message that requests the start of the synchronization to a certain CDS (CDS A in the case of FIG. 4) of the three CDS device s (S130) (second process).

The CDS A 200A that has received the StartSync message forwards the StartPeerSync message that informs the remaining CDS devices (CDS B and CDS C) of the fact that synchronization will be started (S140) (third process).

Each of the CDS A 200A that has forwarded the StartPeerSync message, and the CDS B 200B and the CDS C 200C that have received the StartPeerSync message performs synchronization with the remaining CDS devices exempting itself (fourth process).

The synchronization includes exchanging the multimedia content stored in each CDS and the metadata for the content according to the policy specified by the user. As such, in the case of the process of performing the synchronization, each of CDS devices 200A, 200B and 200C requests the object list that includes the objects of synchronization (S150) (fourth process), and downloads objects necessary for synchronization based on the object list obtained by the request (S160) (fourth process).

Finally, each of the three CDS devices 200A, 200B and 200C updates the object list changed by the downloaded objects, and reports the result to the CP 100 (S170).

As such, in the case where there are more than three CDS devices, synchronization does not have to be performed for the maximum N(N-1)/2 times.

Further, a computer readable recording medium that can store the program code for executing the above-described method should be included in the scope of the rights of the present invention.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

The method and apparatus of the present invention has the following advantages.

First, when synchronization between a plurality of content directory service devices is performed, the number of synchronizations can be minimized.

Second, by lowering the reliance on the control point, the time required for the synchronization and the network traffic caused by the synchronization can be minimized.

What is claimed is:

1. A method of synchronizing a plurality of content directory service (CDS) devices in a home network that includes N CDS devices that provide metadata of multimedia content existing in the home network, and a control point (CP) that receives the metadata from the N CDS devices and requests a replay to a media renderer, the method comprising:
   retrieving and discovering the N CDS devices in a home network, by a CP;
   transmitting a first message that requests synchronization, to a first CDS device of the N CDS devices, by the CP;
   forwarding a second message from the first CDS device to other CDS devices of the N CDS devices that informs the other CDS devices that the synchronization will be started by the first CDS device that has received the first message; and
   synchronizing each of the N CDS devices with each other;
   wherein the home network uses an UPnP AV architecture.

2. The method of claim 1, wherein the retrieving and discovering comprises obtaining an object list from the discovered CDS devices, and selecting the objects to be synchronized based on the obtained object list.

3. The method of claim 1, wherein the synchronizing comprises sending a request for an object list that includes objects to be synchronized by each of the N CDS devices to each other, and downloading objects necessary for synchronization based on the object list.

4. The method of claim 3, the synchronizing comprises, updating the object list, and reporting the result to the CP.

5. The method of claim 1, where N>2.

6. The method of claim 1, wherein the first message is a StartSync message, and the second message is a StartPeerSync message.

7. A system comprising:
   a media server comprising a processor, a memory and built-in content directory service (CDS) devices that provide metadata of multimedia content existing in a home network, and provide multimedia content;
   a media renderer that replays the provided multimedia content; and
   a control point (CP) that controls the media server and the media renderer, and synchronizes the CDS devices in a synchronization,
   wherein the synchronization between the CDS devices is performed where the CP transmits a first message that requests synchronization to a first CDS device of the CDS devices, and the first CDS device forwards a second message to the other CDS devices of the CDS devices that informs the other CDS devices that the synchronization will be started;
   wherein the home network comprises an UPnP AV architecture.

8. The system of claim 7, wherein the first CDS device requests an object list comprising objects to be synchronized from the other CDS devices, and downloads necessary objects to be synchronized based on the object list obtained.

9. The system of claim 8, wherein the first CDS device updates the object list, and reports the result to the CP.

10. The system of claim 7, wherein the first CDS device comprises:
    a log-change-management unit that manages a change of a log information of other CDS devices, wherein the other CDS devices provide metadata of multimedia content existing in a home network;
    a log-change-providing unit that provides information on the change of the log information managed by the log-change-management unit to the other CDS, and a control point (CP); and
    an anchor-information-management unit that manages anchor information that can determine whether an object list of the CDS device has been updated by a synchronization process with other CDS devices and the CDS device .

11. The system of claim 10, further comprising:
    a transaction-management unit that prevents the other CDS and the CP from changing the object list while the synchronization process is performed.

12. The system of claim 10, further comprising:
    a transmission and reception unit that transmits and receives CDSmultimedia content based on the list of objects to be synchronized.

13. The system of claim 10, wherein the log-change-providing unit provides information on the change of the log information in DIDL-Lite form.

* * * * *